United States Patent
Ogura et al.

(10) Patent No.: US 10,273,925 B2
(45) Date of Patent: Apr. 30, 2019

(54) TWO-STROKE INTERNAL COMBUSTION ENGINE

(71) Applicants: YAMABIKO CORPORATION, Ohme-shi, Tokyo (JP); OPPAMA INDUSTRY Co., Ltd, Yokosuka-shi, Kanagawa (JP)

(72) Inventors: Koichirou Ogura, Tokyo (JP); Kohsuke Watanabe, Yokosuka (JP); Naoto Kawahara, Yokosuka (JP); Yuichi Tsuyuki, Yokosuka (JP)

(73) Assignees: YAMABIKO CORPORATION, Ohme-Shi, Tokyo (JP); OPPAMA INDUSTRY CO., LTD, Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/384,892

(22) Filed: Dec. 20, 2016

(65) Prior Publication Data

US 2017/0184067 A1    Jun. 29, 2017

(30) Foreign Application Priority Data

Dec. 24, 2015    (JP) .................... 2015-251262

(51) Int. Cl.

| | |
|---|---|
| *F02P 5/04* | (2006.01) |
| *F02B 63/02* | (2006.01) |
| *F02B 75/02* | (2006.01) |
| *F02P 3/06* | (2006.01) |
| *F02P 5/15* | (2006.01) |
| *F02P 1/08* | (2006.01) |
| *F02P 3/08* | (2006.01) |

(52) U.S. Cl.
CPC ............... *F02P 5/04* (2013.01); *F02B 63/02* (2013.01); *F02B 75/02* (2013.01); *F02P 1/086* (2013.01); *F02P 3/06* (2013.01); *F02P 5/1502* (2013.01); *F02B 2075/025* (2013.01); *F02P 3/0846* (2013.01); *Y02T 10/46* (2013.01)

(58) Field of Classification Search
CPC ...................... F02D 2700/05; F02D 2700/052
See application file for complete search history.

(56) References Cited

U.S. PATENT DOCUMENTS

| | | | | |
|---|---|---|---|---|
| 4,611,570 A | * | 9/1986 | Nash ....................... | F02P 1/086 123/406.57 |
| 5,245,965 A | * | 9/1993 | Andersson .............. | F02B 63/02 123/335 |
| 5,775,297 A | * | 7/1998 | Koike ...................... | F02P 5/06 123/406.51 |
| 7,249,586 B2 | | 7/2007 | Andersson et al. | |

(Continued)

*Primary Examiner* — Hung Q Nguyen
*Assistant Examiner* — Mark L. Greene
(74) *Attorney, Agent, or Firm* — Baker & Hostetler LLP

(57) ABSTRACT

An internal combustion engine according to the present invention has an ignition control device. When a rotational speed of the internal combustion engine increases beyond a predetermined rotational over speed, the ignition control device advances an ignition timing of the ignition plug to a first BTDC angle where proper combustion is performed. Further, the ignition control device performs a misfire stroke or strokes of the ignition plug in one rotation or rotations of the crankshaft after the proper combustion is performed by activating the ignition plug at the first BTDC angle.

6 Claims, 4 Drawing Sheets

(56) References Cited

U.S. PATENT DOCUMENTS

| | | | |
|---|---|---|---|
| 8,469,001 B2* | 6/2013 | Yoshizaki | F02D 11/04 |
| | | | 123/198 DC |
| 9,726,095 B2* | 8/2017 | Yoshizaki | F02B 63/02 |
| 2010/0132665 A1* | 6/2010 | Graf | F02P 5/06 |
| | | | 123/350 |
| 2012/0227716 A1* | 9/2012 | Schoenfeld | F01N 1/089 |
| | | | 123/65 PE |
| 2015/0184595 A1* | 7/2015 | Honzawa | F02B 63/02 |
| | | | 123/41.58 |

* cited by examiner

TWO-STROKE INTERNAL COMBUSTION ENGINE

FIELD OF THE INVENTION

The present invention relates to a two-stroke internal combustion engine, specifically, to a two-stroke internal combustion engine which is mounted on a handheld engine-driven working machine, such as a brush cutter, a chain saw, an engine cutter, and a hedge trimmer.

BACKGROUND OF THE INVENTION

A two-stroke internal combustion engine mounted on a handheld engine-driven working machine has a piston disposed in a cylinder and connected to a crankshaft, an ignition plug disposed in an upper portion of the cylinder, and an ignition control device activating the ignition plug. Effective activation of the ignition plug ignites fuel-air mixture in the cylinder to combust it, and inflation of the combusted air gives a force to the piston so as to move the piston from a top dead center position to a bottom dead center position. The ignition control device can set an ignition timing of the ignition plug with respect to the top dead center position of the piston.

In the two-stroke internal combustion engine, the ignition plug is normally activated for each rotation of the crankshaft. Further, the ignition timing of the ignition plug is advanced from the top dead center position of the piston. This is because there is a time lag from ignition of fuel-air mixture in the cylinder to reach of combustion of the mixture to the piston to give a force to the piston. Generally, the more the rotational speed increases, the larger the advanced angle is.

In a high rotational speed range, however, a state in which the ignition timing of the ignition plug is advanced from the top dead center position largely is maintained, the force given to the piston accelerates the internal combustion engine, so that the rotational speed of the internal combustion engine continues to increase. Thus, the ignition control device retards the ignition timing of the ignition plug in the rotational speed range, for example, to near the top dead center position. This decreases the force given to the piston, and prevents the rotational speed of the internal combustion engine from continuing to increase (for example, see Patent Publication 1).

PRIOR ART PUBLICATION

Patent Publication 1: U.S. Pat. No. 7,249,586

In the handheld engine-driven working machine, there may be in a state in which the internal combustion engine does not subject to load or fuel rate is extremely lean, for example, when a carburetor is incorrectly set, the carburetor is unexpectedly clogged with waste, environment (temperature and height) is changed and so on. In this case, when the throttle of the internal combustion engine is fully opened, the rotational speed may be higher than a normal rotational speed range. Further, self-ignition may occur before the ignition timing of the ignition plug. When fuel-air mixture is combusted due to self-ignition, a proper combustion state cannot be obtained at the ignition timing according to the ignition control device, so that the ignition timing is out of control. Further, since combustion due to self-ignition corresponds to combustion due to an ignition timing advanced from the top dead center position, a force given to the piston accelerates the internal combustion engine, so that the rotational speed of the internal combustion engine continues to increase. As a result, the engine may be burned out or parts of the engine may be damaged.

Thus, the object of the present invention is to provide a two-stroke internal combustion engine which can prevent the rotational speed thereof from continuing to increase and prevent the ignition control device from being out of control due to self ignition, and to provide a handheld engine-driven working machine on which the two-stroke internal combustion engine is mounted.

SUMMARY OF THE INVENTION

To achieve the above-stated object, a two-stroke internal combustion engine according to the present invention comprises a cylinder; a crankshaft; a piston disposed in the cylinder and connected to the crankshaft; an ignition plug disposed in an upper portion of the cylinder; and an ignition control device activating the ignition plug; wherein when a rotational speed of the internal combustion engine increases beyond a predetermined rotational over speed, the ignition control device advances an ignition timing of the ignition plug to a first BTDC angle where proper combustion is performed, and wherein the ignition control device performs a misfire stroke or strokes of the ignition plug in one rotation or rotations of the crankshaft after the proper combustion is performed by activating the ignition plug at the first BTDC angle.

In this two-stroke internal combustion engine, when the rotational speed of the internal combustion engine increases beyond the predetermined rotational over speed, the ignition timing of the ignition plug is advanced to the first BTDC angle to perform proper combustion. The proper combustion is combustion which is caused by ignition of the ignition plug activated by the ignition control device in a compression stroke where fuel-air mixture is compressed, and the proper combustion does not include combustion due to self-ignition. Thus, even if conditions for causing self-ignition are fulfilled, the ignition plug could be activated before a BTDC angle where self-ignition would occur so that an out-of-control state of the ignition control device due to self ignition can be prevented. In this case, however, the angular advance of the ignition timing causes an action of continuing to increase the rotational speed of the internal combustion engine. In the present invention, the misfire stroke or strokes of the ignition plug is/are performed in one rotation or rotations of the crankshaft after the proper combustion is performed by activating the ignition plug at the first BTDC angle, so that a force given to the piston is decreased and the action of continuing to increase the rotational speed of the internal combustion engine can be prevented.

In an embodiment of the above-stated internal combustion engine, preferably, when the rotational speed of the internal combustion engine increases beyond the predetermined rotational over speed, the ignition control device advances the ignition timing of the ignition plug to the first BTDC angle discretely.

In this embodiment, when the rotational speed of the internal combustion engine is equal to or larger than the predetermined rotational over speed, an out-of-control state of the ignition control device can be surely prevented.

In an embodiment of the above-stated internal combustion engine, preferably, when the rotational speed of the internal combustion engine is equal to or larger than the predetermined rotational over speed, the ignition control device repeats an action of performing proper combustion by activating the ignition plug at a timing equal to or earlier than the first BTDC angle and an action of subsequently performing a misfire stroke or strokes of the ignition plug in one rotation or rotations of the crankshaft.

In this embodiment, when the rotational speed of the internal combustion engine is equal to or larger than the predetermined rotational over speed, an out-of-control state of the ignition control device can be surely prevented, and the action of continuing to increase the rotational speed of the internal combustion engine can be surely prevented.

In an embodiment of the above-stated internal combustion engine, preferably, the ignition control device includes a capacitor which repeats charge and discharge for activating the ignition plug, and in the misfire stroke or strokes of the ignition plug, the ignition timings of the ignition plug are the first BTDC angle and a second BTDC angle which is larger than the first BTDC angle. The second BTDC angle is defined so that ignition fails combustion and the capacitor cannot be charged enough for ignition until the first BTDC angle.

In an embodiment of the above-stated internal combustion engine, preferably, the first BTDC angle is larger than a maximum BTDC angle in a rotational speed range less than the predetermined rotational over speed.

Further, to achieve the above-stated object of the present invention, a handheld engine-driven working machine according to the present invention includes the above-stated two-stroke internal combustion engine.

The two-stroke internal combustion engine according to the present invention and the handheld engine-driven working machine on which the two-stroke internal combustion engine is mounted can prevent the rotational speed of the internal combustion engine from continuing to increase and prevent the ignition control device from being out of control due to self-ignition.

DETAILED DESCRIPTION OF EMBODIMENTS

Figure 1:
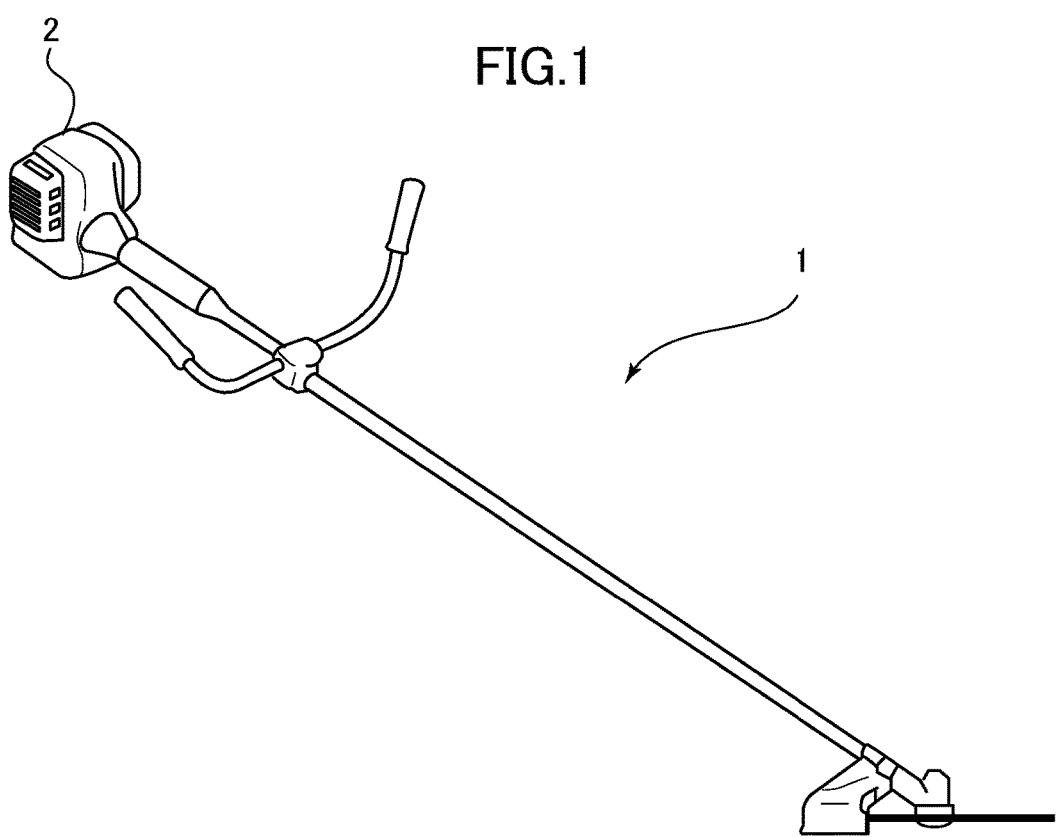
FIG. 1 is a perspective view of a brush cutter according to the present invention.

Now, referring to the drawings, an embodiment of a brush cutter according to the present invention will be explained.

FIG. 1 is a perspective view of a brush cutter which is an example of a handheld engine-driven working machine according to the present invention. The brush cutter 1 has a two-stroke internal combustion engine 2 for driving it.

Figure 2:
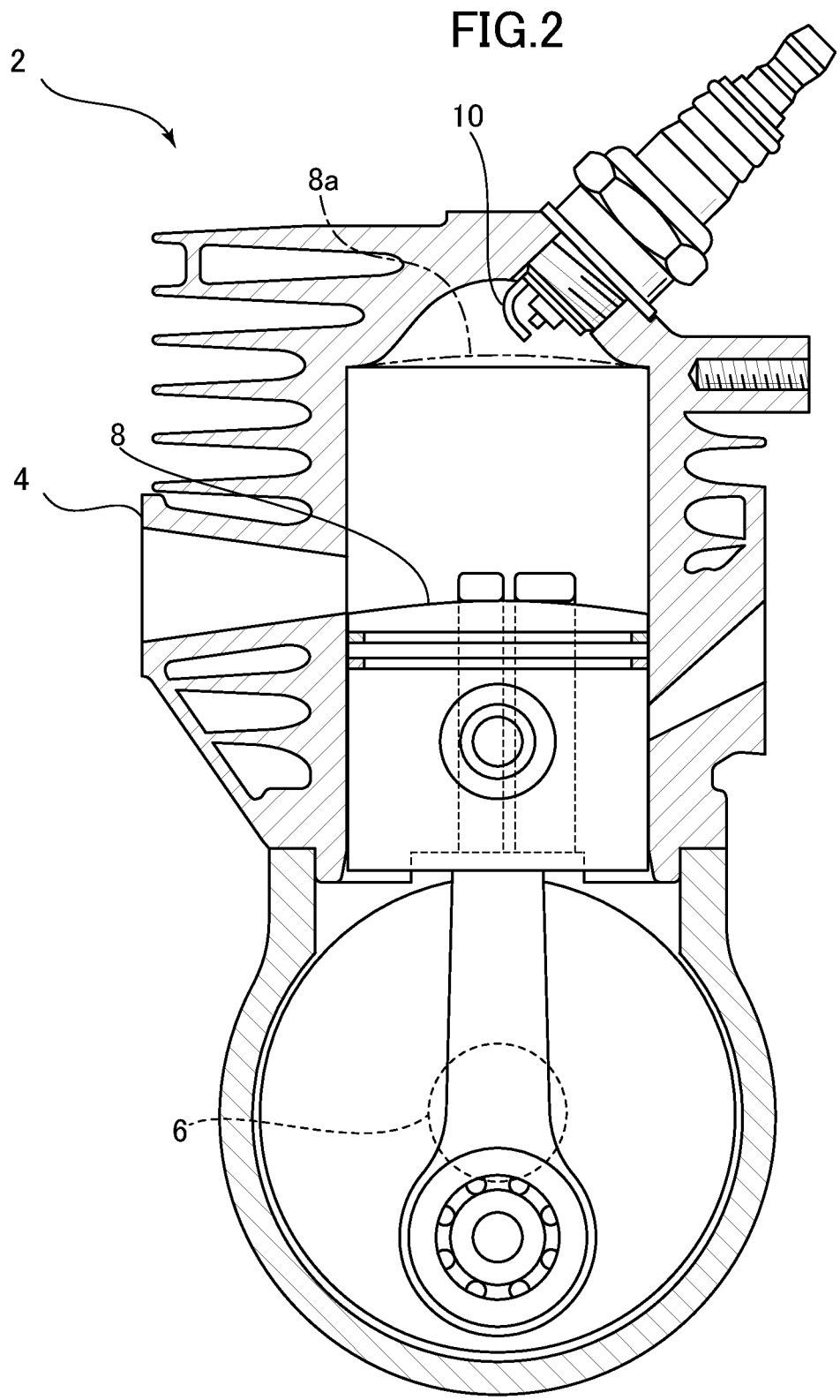
FIG. 2 is a schematic view of an internal combustion engine according to the present invention.

FIG. 2 is a schematic view of the two-stroke internal combustion engine according to the present invention. The internal combustion engine 2 has a cylinder 4, a crankshaft 6, a piston 8 disposed in the cylinder 4 and connected to the crankshaft 6, and an ignition plug 10 disposed in an upper portion of the cylinder 4. In a compression stroke of the internal combustion engine 2, the piston 8 is raised to a top dead center position 8a. Generally, the ignition plug 10 is effectively activated at a timing before the piston 8 reaches the top dead center position 8a to combust fuel-air mixture in the cylinder 4, so that a downward propelling force is given to the piston 8.

Figure 3:
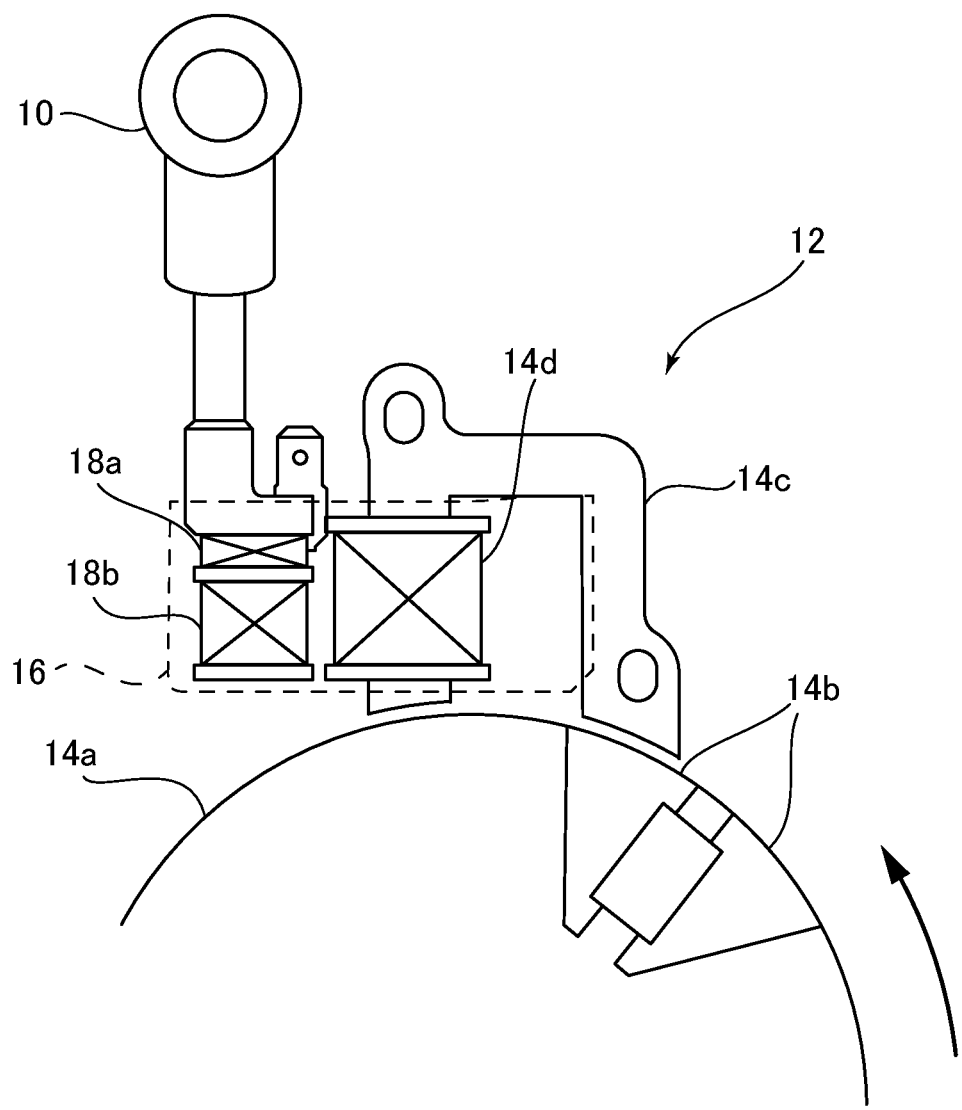
FIG. 3 is a schematic view of an ignition control device of the internal combustion engine according to the present invention.

FIG. 3 is a schematic view of an ignition control device of the internal combustion engine according to the present invention. The internal combustion engine 2 has an ignition control device 12 activating the ignition plug 10.

The ignition control device 12 has a pair of magnets 14b provided on a periphery of a flywheel 14a attached to the crankshaft 6, a U-shaped iron core 14c located adjacent to the periphery of the flywheel 14a, and an input coil 14d wound around the iron core 14c. Further, the ignition control device 12 has a control circuit section 16 connected to the input coil 14d, a primary coil 18a connected to the control circuit section 16, and a secondary coil 18b connected to the ignition plug 10.

Figure 4:
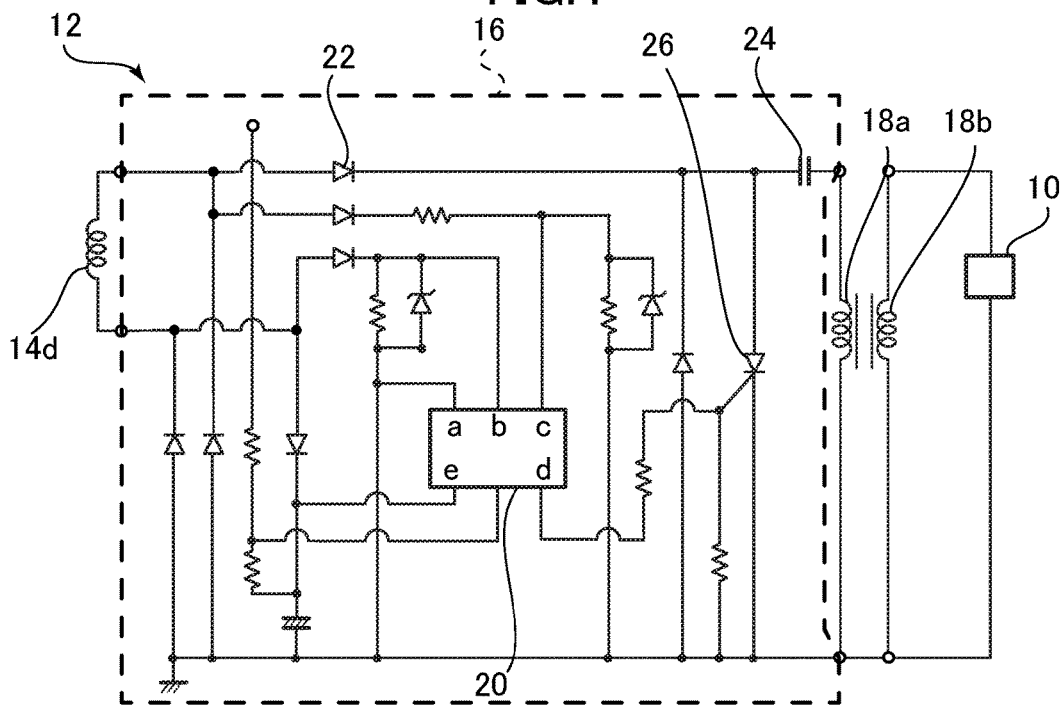
FIG. 4 is a circuit diagram of the ignition control device of the internal combustion engine according to the present invention.

FIG. 4 is a circuit diagram of the ignition control device of the internal combustion engine according to the present invention. As shown in FIG. 4, the control circuit section 16 has a processor 20, a diode 22, a capacitor 24, and a switching thyristor 26. Pin a and e of the processor 20 are connected to the input coil 14d, and a voltage deduced in the input coil 14d supply an electric power to the processor 20. Pins b and c of the processor 20 are also connected to the input coil 14d, and the processor 20 receives an electric signal induced in the input coil 14d. The diode 22, the capacitor 24 and the primary coil 18a are connected to the input coil 14d in series. The switching thyristor 26 is connected to the capacitor 24 and the primary coil 18a in parallel. Further, a pin d of the processor 20 is connected to a gate of the switching thyristor 26. When the pin d is LOW the thyristor 26 is in a non-current-carrying state, and the pin d is HIGH, the thyristor 26 is in a current-carrying state.

Next, an operation of the internal combustion engine according to the present invention will be explained.

When the crankshaft 6 is rotated due to an operation of the internal combustion engine 2, the pair of the magnets 14b attached to the flywheel 14a passes near the U-shaped iron core 14c. This induces a voltage in the input coil 14d so that current flows in the input coil 14d. The processor 20 is driven by the voltage supplied from the input coil 14d through the pins a and e, and receives an electric signal of the current through the pins b and c. The processor 20 detects or calculates a rotational speed and an angular position of the internal combustion engine 2 by using such electrical signals.

When the processor 20 makes the pin d LOW so that the thyristor 26 is in the non-current-carrying state, the capacitor 24 is charged by the voltage induced in the input coil 14d. When the ignition timing of the ignition plug 10 comes, the processor 20 makes the pin d HIGH so that the thyristor 26 becomes in the current-carrying state. Thus, the capacitor 24 is discharged to carry current through the primary coil 18a. The current carried through the primary coil 18a causes a. HIGH voltage pulse in the secondary coil 18b to activate the ignition plug 10.

Figure 5:
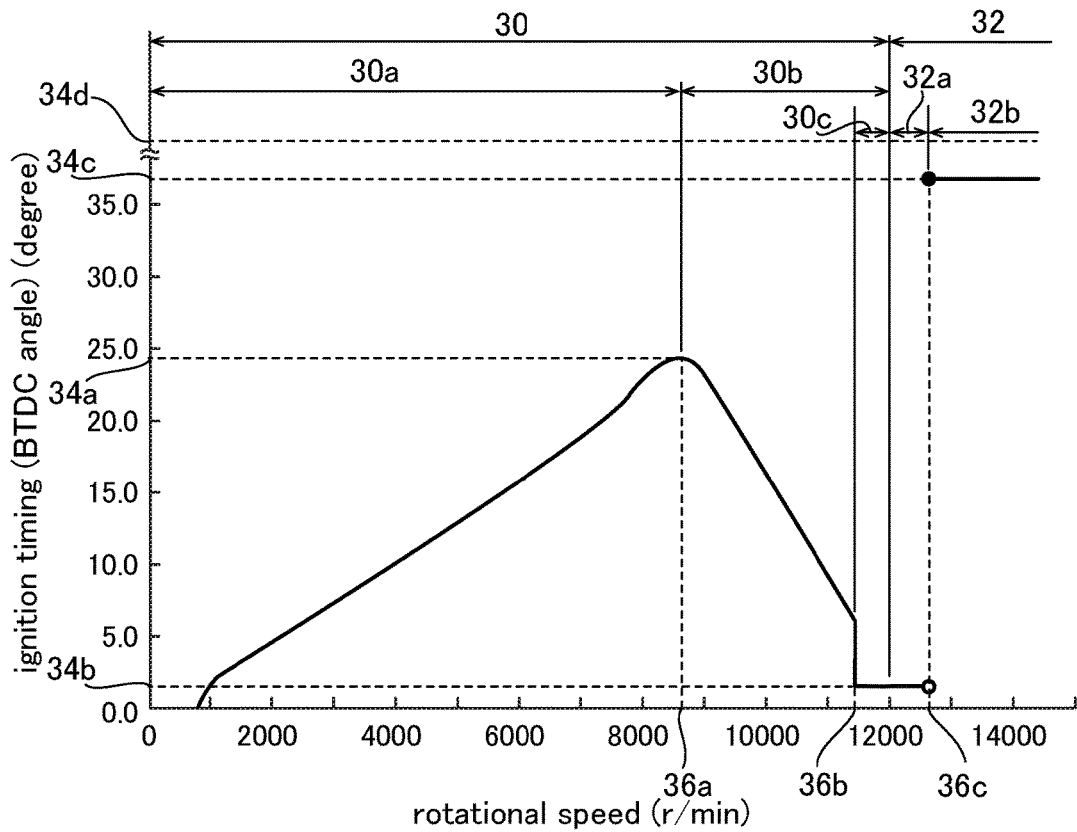
FIG. 5 is a graph showing a relationship between a rotational speed and an ignition timing of the internal combustion engine.

As illustrated in FIG. 5, the processor 20 of the ignition control device 12 sets the ignition timing of the ignition plug 10 according to the rotational speed of the internal combustion engine 2. In the present description, the ignition timing will be indicated by a BTDC angle (an angle of the crankshaft 6 before the top dead center position 8a).

The internal combustion engine 2 has a normal rotational speed range 30 which is allowed in a normal operation. Briefly, on a lower-speed side 30a of the normal rotational speed range 30, the ignition timing is advanced, namely, the BTDC angle of the ignition timing is increased, as the rotational speed of the internal combustion engine 2 increases. Further, on a higher-speed side 30b of the normal rotational speed range 30 of the internal combustion engine 2, the ignition timing is retarded, namely, the BTDC angle of the ignition timing is decreased, as the rotational speed of the internal combustion engine 2 increases. In FIG. 5, at a boundary rotational speed 36a between the lower-speed side 30a and the higher-speed side 30b, the ignition timing is a maximum BTDC angle 34a in the normal rotational speed range 30. Further, when the rotational speed increases up to a predetermined high rotational speed 36b, the ignition timing is a minimum BTDC angle 34b on the higher-speed side 30b of the normal rotational speed range 30. The minimum BTDC angle 34b is, for example, near the top dead center position 8a of the piston 8. In a rotational speed range 30c which is equal to or higher than the predetermined high rotational speed 36b, the ignition timing is preferably maintained at the minimum BTDC angle 34b.

The boundary rotational speed 36a is, for example, within a range of 8000-9500 rpm, and is 8500 rpm in FIG. 5. The maximum BTDC angle 34a is, for example, within a range of 20-35 degrees, and is 24 degrees in FIG. 5. The predetermined high rotational speed 36b is, for example, within a range of 11000-12000 rpm, and is 11500 rpm in FIG. 5. The minimum BTDC angle 34b is, for example, within a range of 0-20 degrees, and is 2 degrees in FIG. 5.

A rotational speed range higher than the normal rotational speed range 30 will be referred to as a rotational over speed range 32. A boundary between the normal rotational speed range 30 and the rotational over speed range 32 is, for example, within a range of 11500-12600 rpm. On a lower-speed side 32a than a predetermined rotational over speed 36c in the rotational over speed range 32, the ignition timing is the minimum BTDC angle 34b. On a higher-speed side 32b than the predetermined rotational over speed 36c, the ignition timing is a self-ignition-preventing BTDC angle 34c which is advanced from the minimum BTDC angle 34b. The self-ignition-preventing BTDC angle 34c is defined as a BTDC angle before self-ignition would occur even if conditions for causing self-ignition are fulfilled. The self-ignition-preventing BTDC angle 34c is, for example, within a range of 35-45 degrees, and is 37 degrees in FIG. 5. The self-ignition-preventing BTDC angle 34c is preferably larger than the maximum BTDC angle 34a in the normal rotational speed range 30.

In the high rotational speed ranges 30c, 32a, the ignition timing is the minimum BTDC angle 34b. In the higher rotational speed range 32b, there is a possibility that self-ignition occurs before the ignition timing, especially when the ignition timing is the minimum. BTDC angle 34b. If such self-ignition occurs, the ignition plug 10 would be ignited before the ignition timing according to the ignition control device 12, so that the rotational speed of the internal combustion engine 2 would start increasing.

When the rotational speed of the internal combustion engine 2 increases beyond the predetermined rotational over speed 36c, the ignition timing of the ignition plug 10 is advanced from the minimum BTDC angle 34b to the self-ignition-preventing BTDC angle 34c. Specifically, self-ignition does not necessarily occur at the predetermined rotational over speed 36c. However, the ignition plug 10 is activated at the self-ignition-preventing BTDC angle 34c, which would be before a BTDC angle at which self-ignition would occur if conditions for causing self-ignition are fulfilled, so that proper combustion is surely performed.

Further, within the rotational over speed range 32, self-ignition tends to occur so that the ignition control device is out of control, and a stably operative region on the lower-speed side 32a than the predetermined rotational over speed 36c is very narrow. Thus, change in the ignition timing from the minimum BTDC angle 34b to the self-ignition-preventing BTDC angle 34c is preferably discrete. In this way the ignition timing can be prevented from being out of control more quickly and accurately than when change in the ignition timing from the minimum BTDC angle 34b to the self-ignition-preventing BTDC angle 34c is gradually Thus, the ignition timing can be prevented from being out of control.

However, by advancing the ignition timing earlier than the top dead center position 8a, the rotational speed of the internal combustion engine 2 continues to increase. Thus, it is preferable that the ignition control device 12 performs a misfire stroke or strokes in one rotation or rotations of the crankshaft 6 after activating the ignition plug 10 at the self-ignition-preventing BTDC angle 34c for performing proper combustion. By performing the misfire stroke, an output decreases so that the rotational speed of the internal combustion engine can be prevented from continuing to increase.

A first way of performing the misfire stroke is to prevent the ignition plug 10 from being ignited. A second way of performing the misfire stroke is to set the ignition timing of the ignition plug 10 as a non-combustion. BTDC angle 34d earlier than the self-ignition-preventing BTDC angle 34c. In the second way, such a non-combustion BTDC angle 34d is defined so that ignition fails combustion and the capacitor 24 is not charged enough for ignition until the self-ignition-preventing BTDC angle 34c. Preferably the non-combustion BTDC angle 34d is an angle outside of the compression stroke. As a result, activation of the ignition plug 10 at the self-ignition-preventing BTDC angle 34c fails ignition so that combustion is not caused. The non-combustion BTDC angle 34d is, for example, within a range of 130-200 degrees. Please note that a fact that the non-combustion BTDC angle 34d is within 180-200 degrees corresponds to a fact that an angle of the crankshaft 6 after the top dead center position 8a is within 160-180 degrees.

When the rotational speed of the internal combustion engine 2 is in the rotational speed range 32b which is equal to or higher than the predetermined rotational over speed 36c, the ignition timing of the ignition plug 10 is constant at the self-ignition-preventing BTDC angle 34c. The ignition control device 12 preferably repeat an action of activating the ignition plug 10 at the self-ignition-preventing BTDC angle 34c to perform proper combustion, and an action or actions of performing misfire stroke or strokes of the ignition plug 10 in the subsequent one or more rotations of the crankshaft 6.

Although an embodiment of the present invention has been explained, the present invention is not limited to the embodiment, namely many kinds of modifications can be done within the scope of the present invention, and it goes without saying that such modifications fall within the scope of the present invention.

In the above-stated embodiment, in the rotational speed range which is equal to or higher than the predetermined rotational over speed 36c, the ignition timing of the ignition plug 10 is constant at the self-ignition-preventing BTDC angle 34c, but it may be varied larger or smaller than the self-ignition-preventing BTDC angle 34c if self-ignition can be prevented. Further, setting of the self-ignition-preventing BTDC angle 34c may be corrected in accordance with usage conditions considered in the handheld engine-driven working machine 1.

In the above-stated embodiment, an example in which the handheld engine-driven working machine is a brush cutter is explained, but the handheld engine-driven working machine may be a chain saw, an engine cutter, a hedge trimmer and so on.

What is claimed:

1. A two-stroke internal combustion engine comprising:
a cylinder;
a crankshaft;
a piston disposed in the cylinder and connected to the crankshaft;
an ignition plug disposed in an upper portion of the cylinder;
an ignition control device activating the ignition plug; and
a throttle;
wherein when the throttle is fully opened and a rotational speed of the internal combustion engine is equal to or higher than a predetermined rotational over speed within a rotational over speed range higher than a normal rotational speed range which is allowed in a normal operation, the ignition control device is configured to:
advance an ignition timing of the ignition plug to a timing equal to or earlier than a first BTDC angle where self-ignition is prevented and proper combustion is performed, and
perform a misfire stroke or strokes of the ignition plug in one rotation or rotations of the crankshaft after the proper combustion is performed at the timing equal to or earlier than the first BTDC angle.

2. The two-stroke internal combustion engine according to claim 1, wherein when the throttle is fully opened and the rotational speed of the internal combustion engine is higher than the predetermined rotational over speed, the ignition control device is configured to advance the ignition timing of the ignition plug to the first BTDC angle discretely.

3. The two-stroke internal combustion engine according to claim 1, wherein when the rotational speed of the two-stroke internal combustion engine is equal to or larger than the predetermined rotational over speed, the ignition control device is configured to repeat an action of performing proper combustion by activating the ignition plug at a timing equal to or earlier than the first BTDC angle and an action of subsequently performing the misfire stroke or strokes of the ignition plug in the one rotation or rotations of the crankshaft.

4. The two-stroke internal combustion engine according to claim 1, wherein the ignition control device includes a capacitor which repeats charge and discharge for activating the ignition plug, and in the misfire stroke or strokes of the ignition plug, ignition timings of the ignition plug are the first BTDC angle and a second BTDC angle which is larger than the first BTDC angle, the second BTDC angle being defined so that ignition fails combustion and the capacitor cannot be charged enough for ignition until the first BTDC angle.

5. The two-stroke internal combustion engine according to claim 1, wherein the first BTDC angle is larger than a maximum BTDC angle in a rotational speed range less than the predetermined rotational over speed.

6. A handheld engine-driven working machine including the two-stroke internal combustion engine according to claim 1.

* * * * *